US008861552B2

(12) United States Patent
Malekpour

(10) Patent No.: US 8,861,552 B2
(45) Date of Patent: Oct. 14, 2014

(54) FAULT-TOLERANT SELF-STABILIZING DISTRIBUTED CLOCK SYNCHRONIZATION PROTOCOL FOR ARBITRARY DIGRAPHS

(75) Inventor: Mahyar R. Malekpour, Hampton, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 449 days.

(21) Appl. No.: 13/364,814

(22) Filed: Feb. 2, 2012

(65) Prior Publication Data

US 2012/0207258 A1   Aug. 16, 2012

Related U.S. Application Data

(60) Provisional application No. 61/442,826, filed on Feb. 15, 2011.

(51) Int. Cl.
*H04J 3/06* (2006.01)
*G06F 1/12* (2006.01)

(52) U.S. Cl.
CPC .......................................... *G06F 1/12* (2013.01)
USPC ............ 370/503; 370/464; 370/498; 370/501

(58) Field of Classification Search
None
See application file for complete search history.

(56) References Cited

U.S. PATENT DOCUMENTS

| | | | |
|---|---|---|---|
| 4,979,191 A | 12/1990 | Bond et al. | |
| 5,775,996 A * | 7/1998 | Othmer et al. | 463/40 |
| 6,671,821 B1 | 12/2003 | Castro et al. | |
| 7,792,015 B2 | 9/2010 | Malekpour | |
| 7,996,714 B2 | 8/2011 | O'Connell et al. | |
| 8,255,732 B2 * | 8/2012 | Malekpour | 713/400 |
| 2002/0129296 A1 | 9/2002 | Kwiat et al. | |
| 2008/0084833 A1 * | 4/2008 | Picard | 370/280 |
| 2009/0102534 A1 | 4/2009 | Schmid et al. | |
| 2009/0122812 A1 | 5/2009 | Steiner et al. | |
| 2010/0019811 A1 | 1/2010 | Malekpour | |
| 2012/0207183 A1 * | 8/2012 | Bobrek et al. | 370/511 |
| 2012/0243438 A1 * | 9/2012 | Steiner et al. | 370/254 |

OTHER PUBLICATIONS

T. K. Srikanth et al., "Optimal Clock Synchronization," Journal of the Association for Computing Machinery, Jul. 1987, pp. 626-645, vol. 34, No. 3, Cornell University, Ithaca, New York.

(Continued)

*Primary Examiner* — Hassan Phillips
*Assistant Examiner* — Gautam Sharma
(74) *Attorney, Agent, or Firm* — Andrea Z. Warmbier

(57) ABSTRACT

A self-stabilizing network in the form of an arbitrary, non-partitioned digraph includes K nodes having a synchronizer executing a protocol. K−1 monitors of each node may receive a Sync message transmitted from a directly connected node. When the Sync message is received, the logical clock value for the receiving node is set to between 0 and a communication latency value ($\gamma$) if the clock value is less than a minimum event-response delay (D). A new Sync message is also transmitted to any directly connected nodes if the clock value is greater than or equal to both D and a graph threshold ($T_S$). When the Sync message is not received the synchronizer increments the clock value if the clock value is less than a resynchronization period (P), and resets the clock value and transmits a new Sync message to all directly connected nodes when the clock value equals or exceeds P.

19 Claims, 3 Drawing Sheets

(56) References Cited

OTHER PUBLICATIONS

Arenas, Alex, et al., "Synchronization in complex networks," Physics Reports, pp. 93-153, Dec. 2008, vol. 469, Issue 3.

Daliot, Ariel, et al., "Linear Time Byzantine Self-Stabilizing Clock Synchronization," Proceedings of 7th International Conference on Principles of Distributed Systems, Dec. 2003, pp. 1-12, La Martinique, France.

Davies, Daniel, et al., "Synchronization and matching in redundant systems," IEEE Transactions on Computers, Jun. 1978, pp. 531-539, vol. C-72, No. 6.

Dijkstra, Edsger W., "Self-stabilizing Systems in Spite of Distributed Control," Communications of the ACM, Nov. 1974, pp. 643-644, vol. 17, No. 11.

Dolev, Shlomi, et al., "Self-Stabilizing Clock Synchronization in the Presence of Byzantine Faults," Journal of the ACM, Sep. 2004, pp. 780-799, vol. 51, No. 5.

Kopetz, Hermann, "Real-Time Systems, Design Principles for Distributed Embedded Applications," 1997, p. 47, Kluwar Academic Publishers, Boston, Massachusetts.

Lamport, Leslie, et al., "Synchronizing Clocks in the Presence of Faults," Journal of the ACM, Jan. 1985, pp. 52-78, vol. 32, No. 1.

Malekpour, Mahyar R., "Comments on the "Byzantine Self-Stabilizing Pulse Synchronization" Protocol: Counterexamples," NASA/TM-2006-213951, Feb. 2006.

Malekpour, Mahyar R., "A Byzantine-Fault Tolerant Self-Stabilizing Protocol for Distributed Clock Synchronization Systems," Eighth International Symposium on Stabilization, Safety, and Security of Distributed Systems, Nov. 2006, pp. 1-17.

Malekpour, Mahyar R., "Verification of a Byzantine-Fault-Tolerant Self-Stabilizing Protocol for Clock Synchronization," IEEE Aerospace Conference, Mar. 1-8, 2008, pp. 1-13, Big Sky, Montana.

Malekpour, Mahyar R., "A Self-Stabilizing Byzantine-Fault-Tolerant Clock Synchronization Protocol," NASA/TM-2009-215758, Jun. 2009.

Mirollo, Renato E., et al., "Synchronization of Pulse-Coupled Biological Oscillators," SIAM Journal on Applied Mathematics, Dec. 1990, pp. 1645-1662, vol. 50, No. 6.

Peskin, Charles S., "Mathematical Aspects of Heart Physiology," 1975, pp. 241-278, Courant Institute of Mathematical Sciences, New York, New York.

Srikanth, T. K., et al., "Optimal Clock Synchronization," Journal of the ACM, Jul. 1987, pp. 626-645, vol. 34, No. 3.

Welch, Jennifer L., et al., "A New Fault-Tolerant Algorithm for Clock Synchronization," Information and Computation, Apr. 1988, pp. 1-36, vol. 77, No. 1, Academic Press, Inc.

Daliot, Ariel, et al., "Self-stabilizing Pulse Synchronization Inspired by Biological Pacemaker Networks," http://arxiv.org/pdf/0803.0241v2.pdf, Mar. 4, 2008, pp. 1-45.

Daliot, Ariel, et al., "Linear-time Self-stabilizing Byzantine Clock Synchronization," http://arxiv.org/pdf/cs/0608096v1.pdf, Aug. 25, 2006, pp. 1-31.

Daliot, Ariel, et al., "Linear Time Byzantine Self-Stabilizing Clock Synchronization," http://www.cs.huji.ac.il/~dolev/pubs/byz-ss-clock-synch-TR.pdf, Aug. 7, 2004, pp. 1-18.

\* cited by examiner

FAULT-TOLERANT SELF-STABILIZING DISTRIBUTED CLOCK SYNCHRONIZATION PROTOCOL FOR ARBITRARY DIGRAPHS

CROSS-REFERENCE TO RELATED APPLICATIONS

This application claims the benefit of U.S. Provisional Patent Application No. 61/442,826 filed on Feb. 15, 2011, which is hereby incorporated by reference in its entirety.

STATEMENT REGARDING FEDERALLY SPONSORED RESEARCH OR DEVELOPMENT

The present invention was made by an employee of the United States Government and may be manufactured and used by or for the Government of the United States for governmental purposes without the payment of any royalties thereon or therefor.

TECHNICAL FIELD

The present disclosure relates to a fault-tolerant protocol and system for synchronizing local logical time clocks in an arbitrary, non-partitioned digraph.

BACKGROUND

Distributed systems typically require the accurate, coordinated timing of process steps and task sequences to facilitate overall event synchronization and data correlation. Even when initially set accurately, clocks used in the various devices of the distributed system will differ over time due to inherent clock drift. Each clock frequency source, typically a crystal oscillator, can run at slightly different rates. Error can thus accumulate over time. Operating environment, age, and other factors affect each physical clock somewhat differently, and thus can affect the rate of change and accumulated error within the distributed system as a whole.

Clock synchronization algorithms are therefore essential for managing system resources and controlling communication between nodes of the system. For proper clock synchronization, each node either accesses timing signals originating from a common time source, for instance global positioning satellite signals, or the nodes synchronize their individual local logical time clocks in a distributed way using knowledge from the other nodes.

SUMMARY

A distributed clock synchronization method or protocol is disclosed herein, along with a distributed system that uses the presently disclosed protocol to achieve and maintain clock synchrony. The present approach provides a fault-tolerant solution for a network of K nodes in the form of an arbitrary, non-partitioned directed graph, i.e., a digraph. "True synchrony" is defined as operating and exchanging messages between system nodes in perfect unison, a process that is only possible under the strictest assumptions and under ideal conditions. "Bounded-synchrony", on the other hand, is a more general term that encompasses certain imperfections in the network. Bounded-synchrony refers to the exchange of local time information by nodes of a network in unison but within a given bound. Thus, the term "synchrony" as used herein means "bounded-synchrony".

The networks/digraphs considered in the present disclosure range from fully-connected to 1-connected networks of nodes while also allowing for differences in the network elements. Example networks that may be synchronized via the presently disclosed protocol include grid, ring, fully-connected, bipartite, and star (hub). Other networks may be envisioned, and therefore this list of examples is non-limiting.

The present protocol does not require a particular information flow, nor does it impose changes to the network in order to achieve the desired synchrony. The approach only considers distributed systems in the absence of non-detectable faults. This departure from the Byzantine extreme of the fault spectrum is taken in part because of the niche use and extra cost associated with Byzantine faults. Also, using authentication and error detection techniques it is possible to substantially reduce the effects of a variety of faults in the system.

In particular, a self-stabilizing network is disclosed herein which includes K nodes. Each node communicates with other neighbor nodes, i.e., any nodes that are directly connected to each other, via the transmission or broadcast of low-overhead Sync messages as described in detail herein. The Sync message is the only type of message used to self-stabilize the network. Each of the K nodes includes a synchronizer such as but not limited to a state machine. K−1 monitors in communication with the synchronizer, a local physical oscillator/physical clock, and a logical time clock. The logical time clock has a variable integer clock value that is represented herein as the clock value LocalTimer. The clock value LocalTimer can vary from 0 to a maximum allowable value of P as described herein. Such a logical time clock may be embodied as an integer counter.

The logical time clock is in communication with the synchronizer, is driven by the local physical oscillator, and locally keeps track of the passage of clock time for a given node as the clock value LocalTimer. Each monitor in a given node can receive a Sync message transmitted by another node that is directly connected to or in direct communication with the node in which the monitor resides.

The synchronizer continuously executes the present protocol, with the term "continuously" as used herein meaning truly continuously in an analog embodiment and once per logical clock tick in a digital embodiment. Upon receiving a valid Sync message from one or more of the monitors, the synchronizer executes the steps of the present protocol in accordance with the results of certain threshold comparisons as set forth herein.

An example self-stabilizing network in the form of an arbitrary, non-partitioned digraph, without using a central clock or a centrally generated signal, pulse, or message of any type for self-stabilization, includes K nodes configured to selectively transmit a Sync message. K at all times is at least 1. That is, as few as one node can run the present protocol and operate properly, e.g., a given node may wake up before the others, or a network may temporarily downgrade to one active node, whether or not other nodes are present. The other nodes can integrate into the system/network by joining the only actively present node. Such a scenario is more prevalent in a dynamic network and also when the communication medium is not hard wired between the nodes.

Upon commencing execution of the present protocol, the synchronizer checks the current clock value LocalTimer for its node. If the clock value LocalTimer is less than 0, the LocalTimer is reset, i.e., set equal to 0.

When the clock value LocalTimer is greater than or equal to 0 and a valid Sync message has been received, appropriate steps are taken with respect to the value LocalTimer and/or transmitting of new Sync messages as set forth below. If the valid Sync message is not received, the clock value LocalTimer is compared to P. If LocalTimer equals or exceeds P, LocalTimer is reset and a new Sync message is transmitted to all nodes that are directly connected to the node in which the synchronizer resides. If LocalTimer is less than P in this comparison, LocalTimer is incremented.

If a valid Sync message received, the synchronizer instead performs a set of threshold comparisons. First, if the clock value LocalTimer is less than a minimum event-response delay (D), the clock value LocalTimer is set to between 0 and a communication latency value ($\gamma$) depending on the embodiment. That is, the value may be 0, $\gamma$, or anything in between.

When a valid Sync message is received and the clock value LocalTimer is greater or equal to both D and a calibrated graph threshold ($T_S$), the synchronizer still sets the clock value LocalTimer equal to between 0 and $\gamma$, again depending on the embodiment, but also transmits a new Sync message to all nodes that are directly connected to the node in which the synchronizer resides.

In another embodiment, instead of setting the LocalTimer to between 0 and $\gamma$, the clock value LocalTimer is set instead to the sum of an incoming LocalTimer, i.e., LocalTimerIn, value plus $\gamma$ to compensate for the worst-case message delay.

The above features and advantages and other features and advantages of the present invention are readily apparent from the following detailed description of the best modes for carrying out the invention when taken in connection with the accompanying drawings.

DETAILED DESCRIPTION

The present invention is described herein with reference to the accompanying drawings. The invention, however, may be embodied in many different forms, and therefore should not be construed as being limited to the particular embodiments set forth herein. Further discussion of the present invention is provided in Mahyar R. Malekpour, "A Self-Stabilizing Synchronization Protocol for Arbitrary Digraphs", NASA/TM-2011-217054, February 2011, Mahyar R. Malekpour, "Model Checking a Self-Stabilizing Distributed Clock Synchronization Protocol For Arbitrary Digraphs", NASA/TM-20110217152, May 2011, and Mahyar R. Malekpour, "Correctness Proof for a Self-Stabilizing Distributed Clock Synchronization Protocol For Arbitrary Digraphs". NASA/TM-217184, October 2011, all of which are hereby incorporated by reference in their entireties.

Figure 1:
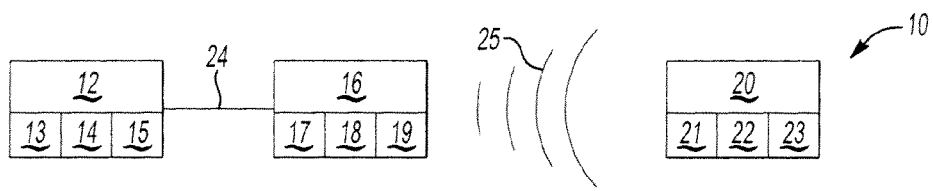
FIG. 1 is a schematic illustration of an example distributed system having local logical time clocks that may be synchronized according to the present protocol.

Referring to the drawings, wherein like reference numbers correspond to like or similar components throughout the several figures, an example distributed system 10 is shown in FIG. 1 that includes a plurality of networked devices 12, 16, and 20. For illustrative simplicity only three devices are shown in FIG. 1. However, any other plurality may be used with the present approach.

Each of the networked devices 12, 16, and 20 includes a respective logical time clock 13, 17, and 21, a respective physical oscillator 14, 18, and 22, e.g., an oscillating crystal, a pacemaker cell, or any other oscillating device, and respective logic circuit 15, 19, and 23 for implementing the present clock synchronization protocol. An example of this protocol is described below with reference to FIG. 5, with variations described with additional reference to FIGS. 5A and 5B.

The networked devices 12, 16, and 20 of FIG. 1 form a system of pulse-coupled entities each pulsating at regular time intervals via their respective oscillators 14, 18, and 22. The devices 12, 16, and 20 are coupled through some physical connection 24, e.g., wires, fiber optic cables, a chemical process, etc., or wirelessly through air or a vacuum as indicated by waves 25.

Figure 3:
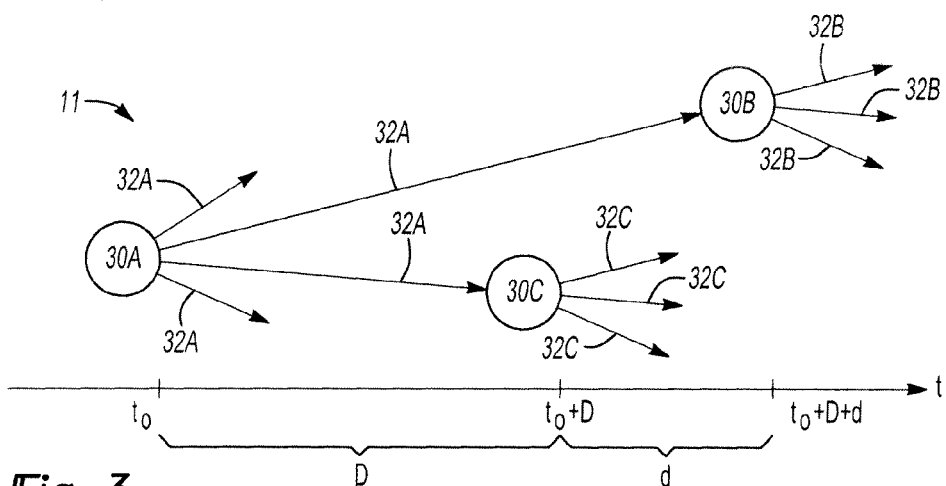
FIG. 3 is schematic illustration of Sync message flow between connected nodes in real time within an example network or digraph.

The underlying system 10 can be modeled as a network 11 comprised of a set of communication nodes, for instance nodes 30A, 30B, 30C as shown in FIG. 3 and discussed below. The devices 12, 16, and 20 communicate with each other by exchanging Sync messages, e.g., 1-bit messages in one particularly low overhead embodiment, although other Sync messages such as 8-bit messages or 16-bit messages may be used. The broadcast or transmission of a Sync message by a given device 12, 16, 20 is realized by transmitting the Sync message at the same time to all devices/nodes that are directly connected to that node. This concept is described in further detail below with reference to the node diagram of FIG. 3.

Figure 5:
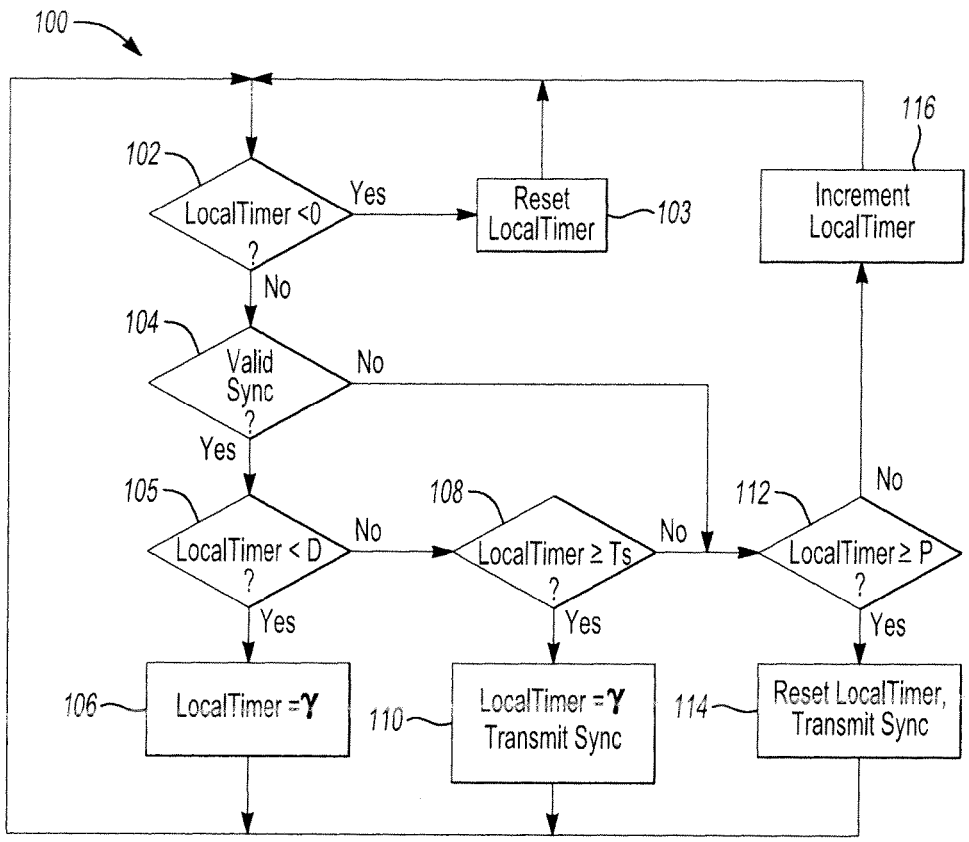
FIG. 5 is a flow chart illustrating one possible embodiment of the present protocol.

The various networked devices 12, 16, and 20 of FIG. 1 execute instructions embodying the present protocol 100, an example of which is shown in FIG. 5, thereby providing a fault-tolerant method for self-stabilization and time synchronization within the distributed system 10. A "fault" is defined herein as a defect or flaw in a component resulting in an incorrect state. The present protocol 100 provides a solution for the synchronization of an arbitrary, non-partitioned network (digraph) in the absence of non-detectable faults. It tolerates well any detectable faults, and thus is fault-tolerant to this extent. The protocol also tolerates node and link dropouts, i.e., failures, as long as the network stays faithful to the definition of the digraph. In other words, provided that the failure of nodes and/or links does not partition the digraph.

Figure 5A:
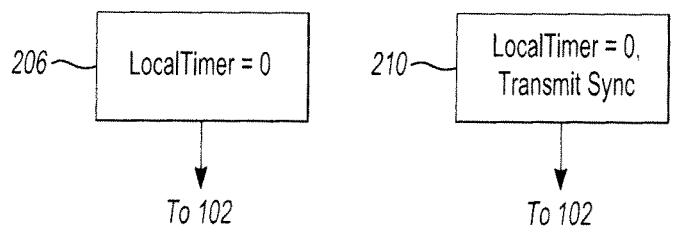
FIG. 5A shows two alternative steps that can be used in a first variation of the protocol shown in FIG. 5.
Figure 5B:
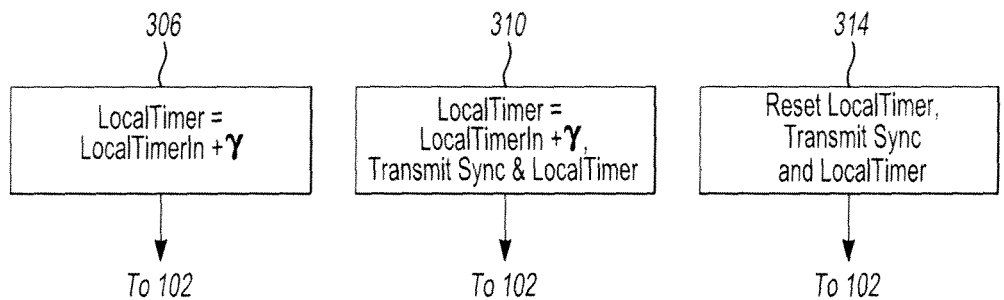
FIG. 5B shows three alternative steps that can be used in a second variation of the protocol shown in FIG. 5.

Continuous execution of the protocol 100 of FIG. 5, such as once per clock tick in a digital embodiment, and its various alternative embodiments of FIGS. 5A and 5B by the various devices, for instance the networked devices 12, 16, and 20 of FIG. 1, provides a self-stabilizing solution for a network in the form of an arbitrary, non-partitioned digraph. The distributed system 10 of FIG. 1 is "self-stabilizing" if from an arbitrary state it is guaranteed to reach a "legitimate" state in a finite amount of time and remain in that legitimate state thereafter. The protocol 100 can self-stabilize from any initial state, i.e., it does not rely on assumptions about the initial state of the network other than the presence of at least one node, which in turn may be anonymous. That is, a node may have no identifier at all, e.g., an IP address, or it may have an identifier that is not unique with respect to identifiers of other nodes used within the network. A legitimate state is defined as a state in which all parts in the distributed system 10 are in bounded synchrony.

The Logical Clock (LocalTimer)

Figure 2:
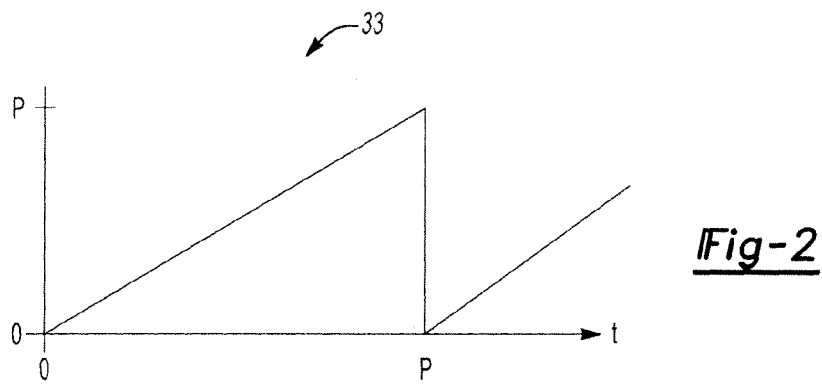
FIG. 2 is a time plot of the variable clock value, LocalTimer, of an example logical time clock.

Referring to FIG. 2, the various logical time clocks 13, 17, and 21 of FIG. 1 are driven by the respective physical oscillators 14, 18, and 22 shown in the same Figure. Each logical time clock 13, 17, and 21 emits a respective local time signal over real time (t), with that signal referred to hereinafter as the clock value LocalTimer. In one embodiment, the value of LocalTimer may be an integer. If the LocalTimer is defined as an integer, it can take on +/− values, with negative values being rare, e.g., potentially occurring during power on and/or severe upset or malicious scenarios. The LocalTimer may not be an integer in another embodiment, but such an embodiment may not adequately prevent the worst case scenarios.

An example trace 33 of the clock value LocalTimer is shown in FIG. 2. Trace 33 is a monotonic linear function increasing from an initial value, e.g., 0, to a calibrated maximum value of P. As noted above, rare cases may occur in which the integer value is negative, and thus the protocol handles this possibility in a preliminary step as set forth below.

If uninterrupted, i.e. when a given node does not receive any Sync messages from other directly connected nodes, the clock value LocalTimer for a given node periodically takes on integer values from an initial value to a maximum value of P, linearly increasing within each period as shown. That is, the clock value LocalTimer is typically bounded by $0 \leq \text{LocalTimer} \leq P$.

Referring to FIG. 3, the distributed system 10 of FIG. 1 can be modeled as an example network 11 in the form of a digraph having a set of communications nodes 30A, 30B, 30C, which are collectively referred to as the nodes 30. Communication between the nodes 30 occurs via transmission/broadcast of messages (arrows 32A, 32B, 32C) over communication channels as is well understood in the art, with the various communications channels collectively representing the available connectivity within the distributed system 10 of FIG. 1.

The underlying topology T is an arbitrary, non-partitioned digraph of $K \geq 1$ nodes 30. The nodes 30 may be anonymous in that sense that they may lack a unique identity, even if some of the nodes have an identifier such as an IP address. All of the nodes 30 are considered to be good, that is, to actively participate in the synchronization process and to be able to correctly execute the protocol 100 of FIG. 5 and its various embodiments as disclosed herein.

As used herein, the term "source node" refers to a particular node 30 from which a Sync message (arrows 32A, 32B, or 32C) originates. Likewise, the term "destination node" refers to a node 30 which receives a Sync message. Thus, a source node may also act as a destination node and vice versa. The communications channels, like the various nodes 30, are also assumed to be good, i.e., to reliably transfer data between source and destination nodes. As noted above, each of the nodes 30 communicates with other nodes 30 by transmitting messages (arrows 32A, 32B, or 32C) to any nodes 30 directly connected to that source node. For instance, in FIG. 3 node 30A, a source node, may transmit a Sync message (arrow 32A) to nodes 30B and 30C, with the nodes 30B and 30C in this instance acting as destination nodes.

The example network 11 of FIG. 3 does not guarantee a relative order of arrival of a given transmitted message at any particular receiving node. Additionally, as noted above the network 11 is characterized by an absence of a central system clock or any centrally-generated signal, pulse, or message of any kind at the network level, i.e., central with respect to the network or global with respect to a particular node 30 and its associated synchronizer 28 (see FIG. 4). The communications channels and nodes 30 can behave arbitrarily provided that, eventually, the network 11 adheres to various protocol assumptions noted below.

Drift Rate ($\rho$)

Each node 30 is driven by a respective independent, free-running local physical oscillator 14, 18, or 22 as shown in FIG. 1, whose phase is not controlled in any way, and by the corresponding logical clocks 13, 17, or 21. The logical clocks 13, 17, and 21 of FIG. 1 locally track the passage of time for their respective node. A single oscillator tick is a discrete value that forms the basic unit of time within the network 11 of FIG. 3.

An ideal oscillator has zero drift rate, $\rho$, with respect to real time t, thus perfectly marking the passage of time. However, real oscillators are characterized by non-zero drift rates with respect to real time. The oscillators 14, 18, and 22 of the various nodes 30 shown in FIG. 3 are assumed to have a known bounded drift rate $\rho$ which is a small constant with respect to real time, where $\rho$ is a unitless, non-negative real value expressed as $0 \leq \rho \leq 1$.

The maximum drift of the fastest LocalTimer used in the network 11 of FIG. 3 over a time interval (t) is given by $(1/(1+\rho))t$. Likewise, the maximum drift of the slowest LocalTimer over time interval (t) is given by $(1/(1+\rho))t$. Therefore, the maximum relative drift of the fastest and slowest nodes 30 of FIG. 3 with respect to each other over a time interval (t) is given by:

$$\delta(t) = ((1+\rho) - 1/(1+\rho))t$$

Communication Delay (D), Network Imprecision (d), and Latency ($\gamma$)

Still referring to FIG. 3, the communication latency ($\gamma$) between adjacent nodes 30 is expressed in terms of the minimum event-response delay (D) and a measure of network imprecision (d). A Sync message (arrow 32A) transmitted at time $t_0$ is expected to arrive at all destination nodes, e.g. node 30C, and to be processed there. Subsequent messages are generated in the interval $[t_0+D, t_0+D+d]$.

Communication between independently clocked nodes 30 is inherently imprecise. The network imprecision, d, is the maximum time difference among all receivers of a message from a transmitting node 30 with respect to real time. The network imprecision, d, is due to oscillator drift with respect to real time, jitter, discretization error, temperature effects, and differences in lengths of the physical communication media. The parameters d and D are assumed to be bounded such that $D \geq 1$ and $d \geq 0$, and both have discrete values with units of a real time clock tick. The communication latency ($\gamma$) is thus expressed in terms of D and d, and is constrained by:

$$\gamma = (D+d)$$

The communication delay between any two adjacent nodes 30 is constrained by $[D, \gamma]$.

Network Topology

A communication link is an edge in the digraph representing a direct physical connection between two nodes 30. A path is a logical connection between two nodes 30 consisting of one or more links. A path-length is the number of links connecting any two nodes. The general topology T considered herein is a strongly connected digraph (e.g., network 11) consisting of K nodes 30, with K=3 in the example embodiment of FIG. 3. Each node 30 is connected to the network 11 by at least one communications channel. There is a path from any given node 30 to every other node 30, and the communications channels are either unidirectional or bidirectional. Furthermore, the present approach assumes there is no direct path from any node 30 back to itself, i.e., no self-loop, and there are no multiple channels directly connecting any two nodes 30 in any one direction. This is the general framework within which the present protocol 100 of FIG. 5 and the alternative embodiments of FIGS. 5A and 5B operate.

Two nodes 30 are said to be "adjacent" to each other if they are connected to each other via a direct communication link. L, an integer value, represents a number of links and denotes the largest loop in the graph, i.e., the maximum value of the longest path-lengths from a node 30 back to itself visiting the nodes 30 along the path only once, except for the first node which is also the last. W, also an integer value representing a number of links, signifies the width or diameter of the graph, i.e., the maximum value of the shortest path connecting any two nodes. For digraphs of size K>1. L and W are bounded by $2 \leq L \leq K$ and $1 \leq W \leq K-1$.

The system 10 of FIG. 1 has two synchronization states: synchronized and unsynchronized. The system 10 is in the unsynchronized state when it starts up or when it is powered on. The synchronized state is entered when the nodes 30 of FIG. 3 are within an expected boundary precision. The distributed system 10 transitions from the unsynchronized state to the synchronized state after execution of the present synchronization protocol 100 of FIG. 5. When the distributed system 10 of FIG. 1 reaches the synchronized state it is said to be in synchrony.

Due to inherent drift in the local times, the present protocol 100 of FIG. 5 is to be executed all the time to ensure that the local times remain synchronized, i.e., executed continuously in an analog implementation or once per local clock tick in a digital implementation. The rate of resynchronization is constrained by physical parameters of the design, for instance drift rates of the physical oscillators 14, 18, and 22 of FIG. 1 as well as precision and accuracy goals. The present approach addresses achieving and maintaining the precision goal of the distributed system 10 of FIG. 1. Therefore, the present protocol enables the distributed system 10 to achieve and maintain synchrony among distributed logical clocks 13, 17, and 21 of FIG. 1 and not the physical oscillators 14, 18, and 22 shown in the same Figure.

The logical clocks 13, 17, and 21 of FIG. 1 are periodically synchronized by an exchange of Sync messages between directly connected nodes 30. That is, a given node 30 selectively transmits a Sync message only to other nodes 30 that are directly connected to it. The process of periodic and automatic synchronization after initial synchrony is achieved is referred to as resynchronization, whereby all nodes 30 reengage in the disclosed synchronization process. A given node 30 is said to "time-out" when its logical clock 13, 17, or 21 reaches a maximum value, i.e., the calibrated maximum value P. i.e., the resynchronization period, described above with reference to FIG. 2.

The resynchronization process begins when the first node, herein defined as the fastest node, times-out and transmits a Sync message. The process ends after the last node, herein defined as the slowest node, transmits a Sync message. For a drift rate $\rho \ll 1$, the fastest node cannot time-out again before the slowest node transmits a Sync message. A Sync message is transmitted either as a result of a resynchronization timeout, or when a node 30 receives a Sync message(s) indicative of other nodes 30 engaging in the resynchronization process. A node 30 is said to be interrupted when it accepts an incoming Sync message before its clock value LocalTimer reaches its maximum value, i.e., before it times-out.

Synchronizer and Monitors

Figure 4:
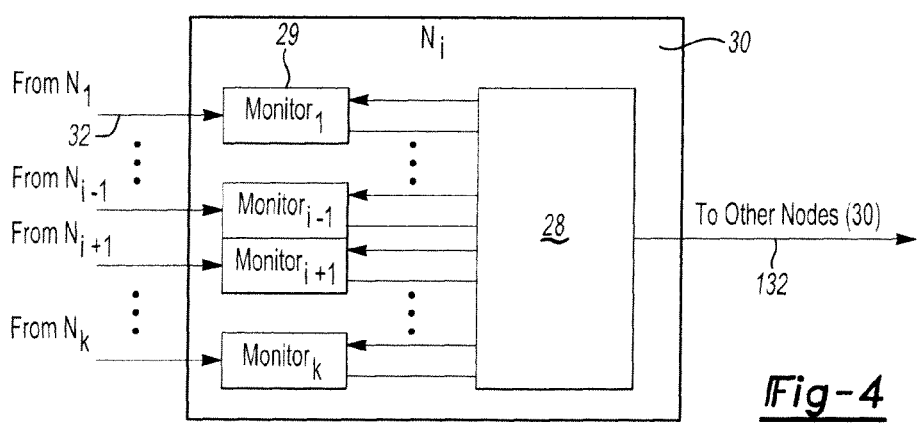
FIG. 4 is a schematic block diagram of the $i^{th}$ node, $N_i$, of an example self-stabilizing network or digraph.

Referring to FIG. 4, transmitted Sync messages from each node 30 are deposited on communication channels. Each node 30 includes a synchronizer 28, such as but not limited to a state machine, and a plurality of monitors 29. To closely observe the behavior of other nodes, each node 30 employs, at least one monitor 29 and, at most, K−1 monitors 29. One monitor 29 is employed for each source of incoming messages, e.g., from directly connected nodes $N_1, N_{i-1}, N_{i+1}$, and $N_k$. A node 30 neither uses nor monitors its own messages.

Each monitor 29 keeps track of the activities of its corresponding source node(s). A monitor 29 detects proper sequence and timelines of the received messages from its corresponding source node, reads, evaluates, time stamps, validates, and stores only the last Sync message it receives from that particular node. Additionally, a monitor 29 ascertains the health condition of its corresponding source node by keeping track of the current state of that node. As the number of nodes K increases in the digraph, so does the number of monitors 29 in each node 30. The monitors 29 may be implemented as separate physical components from the nodes 30 or they may be logically implemented as part of the node functions.

Upon conveying the valid Sync message to the local synchronizer 28, a given monitor 29 disposes of the valid Sync message after it has been kept for one local clock tick. The synchronizer 28 describes the behavior of the node, $N_i$, utilizing assessment results from its monitors 29, where monitor$_j$, $i \neq j$, is the particular monitor for the corresponding node $N_j$.

A Sync message is transmitted to directly connected nodes either as a result of a resynchronization time-out or when a node 30 receives a valid Sync message(s) (arrows 32) indicative of other directly connected nodes 30 engaging in a resynchronization event. A node 30 periodically undergoes a resynchronization process either when its LocalTimer times out or when it receives a Sync message. If it times out, it broadcasts a Sync message (arrow 132 of FIG. 4) and so initiates a new round of the resynchronization process.

However, since only detectable faults are assumed, i.e., F=0 where F is the maximum number of faulty nodes, when a node 30 receives a Sync message, except in a predefined ignore window bounded to [D, TS], it accepts the Sync message and undergoes the resynchronization process where it resets its clock value LocalTimer and relays the Sync message (arrow 132) to other directly connected nodes 30. This process continues until all of the nodes 30 participate in the resynchronization process and converge to a guaranteed precision. The predefined window where the node 30 ignores all incoming Sync messages, i.e., the ignore window, provides a means for the protocol to stop the endless cycle of resynchronization processes triggered by the follow up Sync messages.

Sync Message

In order to achieve synchrony, the nodes 30 communicate by exchanging Sync messages with other directly connected nodes as noted above. The Sync message is the only type of message used by the protocol to self-stabilize the digraph. When the system 10 of FIG. 1 is in synchrony, the protocol overhead is at most one Sync message per resynchronization period (P), where P has units of real time clock ticks and is defined as the upper bound on the time interval between any two consecutive resets of the clock value LocalTimer by a given node 30. Assuming physical-layer error detections are dealt with separately, the reception of a Sync message by any given node 30 is indicative of its validity in the value domain. The present protocol 100 of FIG. 5 and its embodiments of FIGS. 5A and 5B thus perform as intended when the timing requirements of the messages from every node 30 are satisfied. However, in the absence of non-detectable faults the reception of a Sync message is indicative of its validity in the value and time domains. A valid Sync message is discarded after it is relayed to the synchronizer and has been kept for one local clock tick.

Protocol

The following protocol assumptions are made: (1) the number of nodes 30 is denoted by K, where K≥1; (2) all nodes 30 correctly execute the protocol; (3) all links correctly transmit data from their sources to their destinations; (4) T=a non-partitioned, strongly connected digraph; (5) 0≤ρ<<1; (6) a Sync message sent by any given node 30 will be received and processed by all adjacent nodes 30 within the duration of γ, where γ=D+d; and (7) initial values of the variables of a node 30 are within their corresponding data-type range, although possibly with arbitrary values. In a physical implantation, it is expected that some local mechanism exists to enforce type consistency for all variables.

The Distributed Self-Stabilizing Clock Synchronization Problem

To simplify the present protocol 100 of FIG. 5 and its alternative embodiments discussed below, it is assumed that all time references are with respect to an initial real time $t_0$, where $t_0=0$ when the above listed protocol assumptions are satisfied, and for all t≥$t_0$ the system 10 of FIG. 1 operates within the protocol assumptions noted above.

The maximum difference in the value of the clock values LocalTimer for all pairs of nodes at time t, $\Delta_{Net}$ (t), is determined by the following equations that account for the variations in the values of the clock value LocalTimer across all nodes:

$$r=\lceil (W+1)(\gamma+\delta(\gamma) \rceil,$$

$$LocalTimer_{min}(x)=min(N_i \cdot LocalTimer(x)), \text{ and}$$

$$LocalTimer_{max}(x)=max(N_i \cdot LocalTimer(x)), \text{ for all } i.$$

$$\Delta_{Net}(t)=min((LocalTimer_{max}(t)-LocalTimer_{min}(t)), (LocalTimer_{max}(t-r)LocalTimer_{min}(t-r))),$$

where:
  C is a bound on the maximum convergence time, wherein the protocol deterministically converges to synchrony within the time bound (C) as a linear or substantially linear function of P. While substantially non-linear functions are possible, such functions may result in a lack of determinism and/or difficulty of analysis;
  $\Delta_{Net}$(t), for real time t, is the maximum difference of values of the corresponding LocalTimer of any two nodes (i.e., the relative clock skew) for t≥$t_0$; and
  π, the synchronization precision, is the guaranteed upper bound on $\Delta_{Net}$ (1) for all t≥C.

There exists C and π such that the following self-stabilization properties hold:
  Convergence: $\Delta_{Net}$ (C)≤π, 0≤π<P;
  Closure: for all t≥C, $\Delta_{Net}$ (t)≤π;
  Congruence: for all nodes $N_i$, for all t≥C,($N_i$·LocalTimer (t)=γ) implies $\Delta_{Net}$ (t)≤π; and
  Liveness: for all t≥C, the LocalTimer of every node sequentially takes on at least all integer values in [γ, P−π].

Self-Stabilizing Distributed Clock Synchronization Protocol for Arbitrary Digraphs The protocol 100 of FIG. 5 and its embodiments of FIGS. 5A and 5B use a synchronizer 28 and a set of monitors 29 as shown in FIG. 4, both of which execute once every local clock tick. The following parameters apply when all links are bidirectional:

$$T_S \geq (L+2)(\gamma+\delta(\gamma))$$

$$P \geq 3T_S, \text{ for } \rho=0$$

$$P \geq 3(T_S+\delta(T_S)), \text{ for } L=K \text{ and } \rho>0$$

$$P \geq max((2K+1)(\gamma+\delta(\gamma)), 3(T_S+\delta(T_S))), \text{ for } L=f(T) \text{ and } \rho>0.$$

The following is a list of protocol parameters for digraphs, i.e., when at least one link is unidirectional:

$$T_S \geq (K+2)(\gamma+6(\gamma))$$

$$P \geq K(T_S+\delta(T_S))$$

Regardless of the types of links in the network 11 of FIG. 3, the following is a list of protocol measures:

$$C_{Init}=2P+K(\gamma+8(\gamma))$$

$$\Delta_{Init} \leq (K-1)(\gamma+\delta(\gamma))$$

$$C=C_{Init}+\lceil \Delta_{Init}/\gamma \rceil P$$

$$Wd \leq \Delta_{InitGuaranteed} \leq W(\gamma+\delta(\gamma)), \text{ for all } t \geq C$$

$$\pi=\Delta_{InitGuaranteed}+\gamma(P) \geq 0 \text{ for all } t \geq C \text{ and } 0 \leq \pi \leq P.$$

A trivial solution is when P=0. Since P>$T_S$ and the clock value LocalTimer is reset after reaching P (worst-case wrap-around), a trivial solution is not possible.

Referring now to the example flow chart of FIG. 5, the protocol 100 is shown in one possible embodiment with respect to a particular node 30 of FIG. 3. Beginning at step 102, the synchronizer 28 for a particular node 30 determines if the clock value LocalTimer at that particular node 30 has a value that is less than zero. As noted above, this condition in which the LocalTimer has a negative value should not ordinarily be present, but step 102 is still provided for preventative reasons and safety. The protocol 100 proceeds to step 103 if LocalTimer is less than 0. Otherwise, the protocol 100 proceeds to step 104.

At step 103, the synchronizer 28 resets the clock value LocalTimer, i.e., sets the value of LocalTimer to zero, and then returns to step 102. Steps 102 and 103 are alternatively represented in pseudo-code below as the logic statement E0.

At step 104, the protocol 100 proceeds by having the synchronizer 28 determine if a valid Sync message has been received at its node 30, referred to in this context as the receiving node. If a valid Sync message is received the protocol 100 proceeds to step 105, and otherwise proceeds to step 112.

At step 105, the synchronizer 28, having received a valid Sync message at step 104, next determines whether the current clock value LocalTimer is less than the value of the minimum event response delay D. If so, the protocol 100 proceeds to step 106. The protocol 100 proceeds instead to step 108 if LocalTimer is determined at step 105 to be greater than or equal to D.

At step 106, the synchronizer 28 determines that an interruption has occurred and sets the clock value LocalTimer equal to the value of the communication latency γ. Thereafter, the protocol 100 returns to step 102. Steps 104, 105, and 106 are alternatively represented in pseudo-code below as the logic statement E1.

At step 108, the synchronizer 28 determines whether the current clock value LocalTimer, assuming a valid Sync message is received at step 104, equals or exceeds the graph threshold T. If it does, the protocol 100 proceeds to step 110.

However, if the clock value LocalTimer is less than the graph threshold $T_S$, the protocol 100 proceeds instead to step 112.

At step 110 the synchronizer 28 determines that an interruption has occurred and sets the clock value LocalTimer equal to the communication latency γ, and also transmits a Sync message to all other nodes directly connected to its node 30. Thereafter, the protocol 100 returns to step 102. Steps 108 and 110 are alternatively represented in pseudo-code below as the logic statement E2.

At step 112, the synchronizer 28 determines whether LocalTimer equals or exceeds the LocalTimer's maximum value, i.e., P. If so, the synchronizer 28 determines that the node 30 being evaluated has in fact timed out, and proceeds as a result to step 114. If the clock value LocalTimer is determined to be less than P, the protocol 100 proceeds instead to step 116.

At step 114 the synchronizer 28 resets its logical clock, i.e., LocalTimer=0, transmits a Sync message to all directly connected nodes as noted above, and returns to step 102. Steps 112 and 114 are alternatively represented in pseudo-code below as the logic statement E3.

At step 116, the synchronizer 28, having determined at step 112 that LocalTimer is less than P, regardless of whether or not a valid Sync message is received at step 104, increments its corresponding clock value, i.e., LocalTimer=LocalTimer+1, and returns to step 102. Step 116 is alternatively represented in pseudo-code below as the logic statement E4.

In the protocol 100, if Sync message(s) arrive and either of the conditions of steps 105 or 108 are true, then the LocalTimer for that node does not get incremented.

Figure 6:
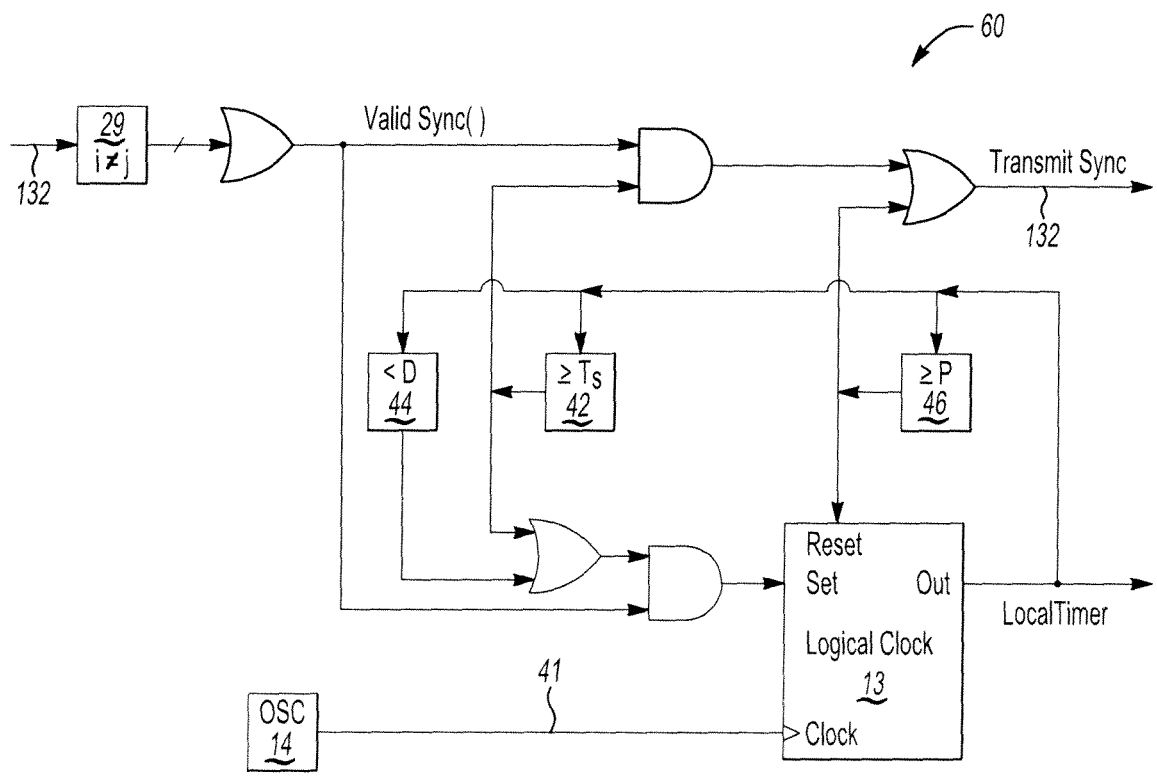
FIG. 6 is a schematic block diagram of an example logic circuit for implementing the $i^{th}$ node of FIG. 4 according to the protocol embodiment of FIG. 5.

Referring briefly to FIG. 6, the embodiment of the protocol 100 shown in FIG. 5 may be physically embodied as a logic circuit 15, for instance residing in the networked devices 12 of FIG. 1, with similar logic circuits 19 and 23 residing in the other devices 16 and 20 of the same Figure. A monitor 29 determines whether a valid Sync message is generated by its monitored node as noted above, and feeds this information into a set of logic gates embodying portions of the synchronizer 28 of FIG. 4. Various logic blocks 42, 44, 46 process the indicated comparative steps, e.g., whether the value from the clock value LocalTimer is less than D in block 44, greater than or equal to $T_S$ in block 42, or greater than or equal to P in block 46.

The logical time clock 13 may be embodied as a type of flip-flop as shown, receiving an oscillator signal 41 from its local physical oscillator (OSC) 14 and outputting its local clock signal as the clock value LocalTimer value used for all comparison steps of the protocol 100 of FIG. 5. Other logical embodiments may be used to encode the required logic set forth in FIG. 5 without departing from the intended inventive scope.

Pseudo-code as noted above in the description of the flow chart of FIG. 5 may be readily envisioned as a series of logic statements E0-E4, with corresponding comments denoted by "//":

```
E0: if (LocalTimer < 0)
        LocalTimer := 0
E1: elseif (ValidSync( ) and (LocalTimer < D))
        LocalTimer := γ,              //interrupted
E2: elseif (ValidSync( ) and (LocalTimer ≥ T_S))
        LocalTimer := γ,              //interrupted
        Transmit Sync,
E3: elseif (LocalTimer ≥ P)           //timed out
        LocalTimer := 0.
        Transmit Sync,
E4: else
        LocalTimer := LocalTimer + 1
```

Additional Discussion

From the expression for $\Delta_{Init}$, the synchronization time C and precision π are functions of the network topology T and the drift rate ρ, specifically the graph's width W and the amount of drift the network experiences. In other words, $C=f(W,\delta(P))$ and $\pi=f(W,\delta(P))$.

From the expression for $\Delta_{Init}$ and $\Delta_{InitGuaranteed}$ it follows that for networks with small W values, $\Delta_{InitGuaranteed}$ occurs instantaneously, but for networks with large W values $\Delta_{InitGuaranteed}$ is a gradual process. The general equation for $\Delta_{Init}$ applies to the ideal (ρ=0, d=0) and semi-ideal (ρ=0, d≥0) scenarios. For these scenarios, $\Delta_{Init} \leq W\gamma$.

Although the initial (coarse) synchrony, $\Delta_{Init}$, occurs within $C_{Init}$, the initial guaranteed precision, $\Delta_{InitGuaranteed}$, takes place after a number of periods and after achieving the initial synchrony. The general equation for π applied to the ideal and semi-ideal scenarios. Since $\Delta_{InitGuaranteed}=f(W,\delta(P))$, for large values of P $\Delta_{InitGuaranteed}=\Delta_{Init}$ and no improvement on $\Delta_{Init}$ is achievable. However, since typically 0≤ρ<<1, for small values of δ(P), $\Delta_{InitGuaranteed}<\Delta_{Init}$ and improvement on $\Delta_{InitGuaranteed}$ is possible.

In particular, for the ideal and semi-ideal scenarios, subsequent resynchronization processes beyond the initial synchrony results in tighter precision. Specifically, for C $C_{Init}+\lceil \Delta_{Init}/\gamma \rceil P$, for the ideal scenario the result is $\Delta_{InitGuaranteed}=0$ and π=0, while for the semi-ideal scenario, $\Delta_{InitGuaranteed}=Wd$ and π=Wd. Therefore, $\Delta_{InitGuaranteed}=0$. Wd, and W(γ+δ(γ)) for the ideal, semi-ideal, and realizable systems (ρ≥0,d≥0), respectively.

After synchrony for the ideal scenario, the nodes periodically pulsate in perfect unison (true synchrony). For the semi-ideal scenario, even in the absence of drift, the system's behavior resembles a ripple effect where the nodes remain at most d apart from each other with the leading node as the center and originator of the ripple. Also, for realizable systems due to the effect of drift, the system's behavior resembles a ripple effect. However, when the nodes periodically pulsate, depending on the amount of drift, the nodes remain at most one duration γ apart from each other with the leading node as the center and originator of the ripple.

Recall that $\pi=f(W,\delta(\gamma))$ and $C=f(W,\delta(\gamma))$. Therefore, depending on the values of W and δ(γ) the precision of the network and convergence time may be quite large. From the expression for 7 it follows that for networks with small W values synchronization occurs instantaneously with optimal precision, while for networks with large W values synchronization is a gradual process with larger precision. For instance, for a fully connected graph, W=1, $\pi=d+\delta(\gamma)$ is at its minimum with minimal dependence on the drift, and the convergence time is at its minimum value of $C=C_{Init}$, whereas for the linear graph, W=K−1, π is at its maximum and more dependent on the drift, and the convergence time is at its maximum value of C. Indeed, for the worst case where drift is very high, no improvement on $\Delta_{Init}$ is possible no matter how much time passes. So, to achieve a desired precision one must reduce W, δ(P), or both.

To reduce W, new links may be added to the graph such that the graph width W is halved and its precision doubled. This implies that the number of links (edges) to be added, E, is given by:

$$E \geq \lceil \log_2 \Delta_{Init} \rceil$$

More accurate oscillators are needed to reduce drift. However more accurate oscillators are more costly. Sometimes a graph cannot or should not be modified by adding new links, and as there are no perfect oscillators, drift may not be improved beyond a certain limit. Thus, other ways for achieving synchrony faster and with more accurate precision are now discussed along with variations of the protocol 100 of FIG. 5.

Variations of the Protocol

Variation #1: Time Shift

In the "if" expressions for E1, E2, and E3 in the above pseudo-code, one can potentially add or subtract a value from the right hand side of the comparisons when comparing with LocalTimer. In other words, E1 can be written as:

```
        elseif (ValidSync( ) and (LocalTimer < (D ± X)),
and E2 as:
        elseif (ValidSync( ) and (LocalTimer ≥ (T_S ± X))
and E3 as:
        elseif (LocalTimer ≥ (P ± X))
``` with X being the same value for all E1, E2, and E3 expressions and for some $X \geq 0$. Of particular interest is when $X \geq D$. In this case, and in conjunction with E0, E1 will not be needed and can be eliminated and thus result in further simplification of the protocol.

Variation #2: Reset

One of the key elements of the present protocol 100 of FIG. 5 is the proper setting of the clock value LocalTimer upon receiving a broadcast Sync message from a directly connected node. The clock value LocalTimer is set to the communication latency γ in the embodiment of the protocol shown in FIG. 5. Thus, when a node 30 times out, it resets its clock value LocalTimer, i.e., LocalTimer=0, and after one duration γ the transmitting and receiving nodes would naturally be in relative synchrony of, at most, d clock ticks from each other. If the clock value LocalTimer is set to D, the protocol 100 behaves similarly but with lower precision. As noted below, setting the clock value LocalTimer to any value less than γ produces lower precision than setting it to the latency γ.

Setting the clock value LocalTimer to other values may not produce the desired effect. On the other hand, if a node gets interrupted the receiving nodes have no knowledge of the broadcasting node's LocalTimer value, which could be either 0 or γ. The clock value LocalTimer is set to γ upon interrupt as noted above. However, it could be assigned other values equal to or greater than 0. An arbitrary value is not going to produce the desired synchrony, but if the value of the broadcasting node's LocalTimer is forwarded, then the clock value LocalTimer of the receiving node could be set to that value, offset by γ, and once again the two nodes would be in relative synchrony.

In this variation the clock value LocalTimer is reset, i.e., LocalTimer=0, upon receiving a Sync message rather than setting the LocalTimer to γ as in steps 106 and 110 of FIG. 5.

Referring briefly to FIG. 5A, steps 106 and 110 of FIG. 5 are therefore simply replaced by alternative steps 206 and 210, with all other steps of the protocol appearing as in FIG. 5. Thus, FIG. 5A is to be read in conjunction with FIG. 5.

Step 206 of FIG. 5A includes having the synchronizer 28 for a particular node determine that an interruption has occurred and resetting the clock value LocalTimer. Thereafter, the protocol returns to step 102 of FIG. 5.

Likewise, at step 210 the synchronizer 28 determines that an interruption has occurred. Here, the synchronizer 28 resets the clock value LocalTimer and also transmits a Sync message to all other nodes that are directly connected to the node of the synchronizer 28 acting at step 210. Thereafter, the protocol 100 returns to step 102 of FIG. 5.

This variation also synchronizes the network for $\rho \geq 0$ and $d \geq 0$ with the same $\Delta_{Init}$, i.e., $\Delta_{Init} \leq (K-1)(\gamma + 0.5(\gamma))$. Also, when $\rho=0$ and $d=0$, unlike the protocol 100 of FIG. 5 where $\Delta_{InitGuaranteed}=0$, $\Delta_{InitGuaranteed}=W\gamma$. Setting the clock value LocalTimer to other values between 0 and γ would produce similar results as the protocol 100 of FIG. 5 and this variation with $0<\Delta_{InitGuaranteed}<W\gamma$. Since $\Delta_{InitGuaranteed}=W\gamma$ in this variation, even in the absence of drift the system's behavior resembles a ripple effect where nodes remain at most γ apart from each other with the leading node as the center and originator of the ripple.

Pseudo-code for this variation is as follows:

```
E0: if (LocalTimer < 0)
        LocalTimer := 0
E1: elseif (ValidSync( ) and (LocalTimer < D))
        LocalTimer := 0,
E2: elseif ((ValidSync( ) and (LocalTimer ≥ T_S))
        LocalTimer := 0,
        Transmit Sync,
E3: elseif (LocalTimer ≥ P)    //timed out
        LocalTimer := 0.
        Transmit Sync,
E4:     else
        LocalTimer := LocalTimer + 1
```

Variation #3: Jump Ahead

In this variation, the current value LocalTimer is transmitted along with the Sync message. Referring briefly to FIG. 5B, steps 106, 110, and 114 of FIG. 5 are simply replaced by alternative steps 306, 310, and 314. Step 306 entails determining via the synchronizer 28 that an interruption has occurred and setting the clock value LocalTimer equal to the sum of the incoming LocalTimer value from the transmitting node, LocalTimerIn, plus the communication latency γ, i.e., LocalTimer=LocalTimerIn+γ. Thereafter, the protocol returns to step 102 as explained above according to FIG. 5.

Likewise, at step 310 the synchronizer 28 determines that an interruption has occurred, and sets the clock value LocalTimer equal to the sum of the incoming value of the LocalTimer from the transmitting node, i.e., LocalTimerIn, plus the communication latency γ, i.e., LocalTimerIn+γ, and also transmits a Sync message and the clock value LocalTimer to all other nodes directly connected to that node. Thereafter, the protocol 100 returns to step 102 as shown in FIG. 5.

Step 314 entails resetting the clock value LocalTimer and transmitting a Sync message and the clock value LocalTimer to all nodes directly connected to that node. Thereafter, the protocol 100 returns to step 102.

This variation introduces more overhead due to the transmission of the LocalTimer value, but synchronizes the network for $\rho \geq 0$ and $d \geq 0$ with the same initial precision. In other words, $\Delta_{Init} \leq (K-1)(\gamma + \beta(\gamma))$. However, the variation produces tighter initial guaranteed precision for the same convergence time, i.e., $\Delta_{InitGuaranteed} (1+d)\delta(P)$ and $C=C_{Init}+\lceil \Delta_{Init}/\gamma \rceil P$.

This variation also requires greater number of exchanges of Sync messages during the convergence process. The excess transmission of Sync messages is due to the burst of relays of Sync messages prior to the convergence. Note that since after receiving a Sync message the clock value LocalTimer of a node gets incremented, all messages will eventually die out when the clock value LocalTimer of a node reaches or exceeds its maximum value of P. In the protocol 100 of FIG. 5, by setting the clock value LocalTimer of a node to γ that node immediately enters the ignore window, a time interval where it ignores all incoming Sync messages. In this variation, however, depending on the initial value of the clock value LocalTimer of a given node, a message may not get ignored until eventually the clock value LocalTimer of a node reaches or exceeds its maximum value of P and then enters the ignore window.

Also, due to an interrupt the slowest nodes may never get set to a γ during a resynchronization process even when the system is in synchrony. As a result (Theorem Congruence), for t≥C the nodes are in synchrony when $N_i$. LocalTimer(t)= Wγ. In the original protocol 100 of FIG. 5, for all t C LocalTimer of every node sequentially takes on at least all integer values in [γ, P–π]. However, for this variation the minimum range of values is [Wγ, P–π].

Pseudo-code for this alternative embodiment of the protocol 100 of FIG. 5 may be readily envisioned as a series of logic statements E0-E4:

```
E0: if (LocalTimer < 0)
        LocalTimer :=0
E1: elseif (ValidSync( ) and (LocalTimer < D))
        LocalTimer := LocalTimerIn + γ,   //interrupted
E2: elseif ((ValidSync( ) and (LocalTimer ≥ T_S))
        LocalTimer := LocalTimerIn + γ,   //interrupted
        Transmit Sync and LocalTimer,
E3: elseif (LocalTimer ≥P)   //timed out
        LocalTimer := 0.
        Transmit Sync and LocalTimer,
E4: else
        LocalTimer := LocalTimer + 1
```

Digraphs and Dynamic Graphs

As noted above, the general form of the distributed synchronization problem (S) is defined by the following septuple:

$$S=(K,T,D,d,\rho,P,F),$$

i.e., the number of nodes (K), network topology (T), event-response delay (D), communication imprecision (d), oscillator drift rate (ρ), synchronization period (P), and number of faults (F), respectively. The most general form of the problem (S) may be described by the following septuple:

$$S'=(K(t),T(t),D,d,\rho,P,F).$$

where K(t) represents the dynamic node count and T(t) represents the dynamic topology for a given K(t). In a dynamic node count the number of nodes comprising the network can change at any given time, and the presented protocol and its variations are readily applicable to this scenario provided the new nodes enter the network from a reset state where they are clear of all residual effects. The dynamic topology allows for topologies with any combination of unidirectional and bidirectional links as described above, whether static or dynamic. That is, for a given K(t) the number of links can change at any time.

While the best modes for carrying out the invention have been described in detail, those familiar with the art to which this invention relates will recognize various alternative designs and embodiments for practicing the invention within the scope of the appended claims.

The invention claimed is:

1. A self-stabilizing network comprising:
a node that includes:
a synchronizer;
a set of monitors in communication with the synchronizer, wherein each monitor in the set of monitors is configured to receive a transmitted Sync message, and wherein the number of monitors in the set of monitors is no more than one fewer than the number of nodes in the network;
a physical oscillator; and
a logical time clock driven by the physical oscillator and having a variable clock value that locally tracks the passage of clock time for the node;
wherein the synchronizer, without using a global clock or a globally-generated signal, globally-generated pulse, or globally-generated message of any kind for self-stabilization, executes a predetermined protocol to thereby:
set the clock value equal to 0 when the clock value is less than 0;
set the clock value equal to between 0 and a communication latency value (γ) when the Sync message is received by the synchronizer and the clock value is less than a minimum event-response delay (D);
set the clock value equal to between 0 and γ and transmit a new Sync message when:
the Sync message is received by the synchronizer; and
the clock value is greater than or equal to both D and to a calibrated graph threshold ($T_S$);
set the clock value to 0 and transmit a new Sync message when the Sync message is not received by the synchronizer and the clock value is greater than or equal to a calibrated resynchronization period (P); and
increment the clock value when the Sync message is not received by the synchronizer and the clock value is less than P;
wherein the network is an arbitrary, non-partitioned digraph that is self-stabilizing, via execution of the protocol, from any initial state, and wherein the synchronizer transmits the Sync message to as many other nodes in the network as are directly connected to the first node.

2. The network of claim 1, wherein the node comprises one of a plurality of nodes, and wherein the synchronizer transmits the new Sync message to any of the plurality of nodes that are directly connected to the node.

3. The network of claim 1, wherein the Sync message is the only type of message used by the protocol to self-stabilize the digraph.

4. The network of claim 1, wherein the protocol deterministically converges to synchrony within a time bound (C) that is a substantially linear function of P.

5. The network of claim 1, wherein the Sync message comprises a 1-bit message.

6. The network of claim 1, wherein the synchronizer ignores all Sync messages that the synchronizer receives within a calibrated ignore window [D, $T_S$].

7. The network of claim 1, wherein at least one of the nodes is anonymous.

8. The network of claim 1, wherein the synchronizer sets the clock value equal to γ when the Sync message is received and the clock value is less than D.

9. The network of claim 1, wherein the synchronizer resets the clock value when the Sync message is received and the clock value is less than D.

10. The network of claim 1, wherein the synchronizer sets the clock value equal to γ and transmits the new Sync message to the as many of the other nodes in the network as are directly connected to the transmitting node when the Sync message is received and the clock value is greater than or equal to both D and $T_S$.

11. The network of claim 1, wherein the synchronizer resets the clock value and transmits the new Sync message to the as many of the other nodes that are directly connected to the transmitting node when the Sync message is received and the clock value is greater than or equal to both D and T.

12. A self-stabilizing network comprising a plurality (K) of nodes in communication with each other, wherein each of the nodes includes:
  a synchronizer;
  a set of no more than K−1 monitors in communication with the synchronizer, wherein each monitor in the set of monitors is configured to receive a transmitted Sync message and an incoming clock value from another of the nodes;
  a physical oscillator; and
  a logical time clock that is in communication with the synchronizer and driven by the physical oscillator, wherein the logical time clock locally keeps track of the passage of time in a node of the synchronizer as a variable integer clock value;
  wherein the synchronizer, without using a global clock or a globally-generated signal, globally-generated pulse, or globally-generated message of any kind for self-stabilization, executes a predetermined protocol that includes:
    when the clock value is less than 0:
      resetting the clock value;
    when a Sync message is received by the synchronizer and the clock value is less than a minimum event-response delay (D):
      setting the clock value equal to the sum of a communication latency value ($\gamma$) and the incoming clock value;
    when the Sync message is received by the synchronizer and the clock value is greater than or equal to both D and a graph threshold ($T_S$):
      setting the clock value equal to the sum of $\gamma$ and the incoming clock value as an updated clock value; and
      transmitting a new Sync message and the updated clock value to as many of the other nodes as are directly connected to the corresponding node;
    when the clock value is less than a calibrated resynchronization period (P) and the Sync message is not received:
      incrementing the clock value; and
    when the clock value is greater than or equal to P:
      setting the clock value to 0; and
        transmitting a new Sync message and the clock value of 0 to the as many of the other K nodes that are directly connected to the corresponding node;
  wherein:
    the network is an arbitrary, non-partitioned digraph; and
    the Sync message is the only type of message that is used by the protocol to self-stabilize the digraph.

13. The network of claim 12, wherein the protocol deterministically converges within a time bound (C) that is a linear function of P.

14. The network of claim 12, wherein at least one of the nodes is anonymous.

15. The network of claim 12, wherein each monitor disposes of all previously received Sync messages after one tick of the logical time clock.

16. The network of claim 12, wherein the synchronizer ignores all Sync messages received within a calibrated ignore window [D, $T_S$].

17. A method for self-stabilizing an arbitrary, non-partitioned digraph of K nodes each including a synchronizer, no more than K−1 monitors per node each in communication with the synchronizer, a physical oscillator, and a logical time clock in communication with the synchronizer that has a variable integer clock value, is driven by the oscillator, and locally keeps track of the passage of time as the clock value, the method comprising:
  setting the clock value for a first node of the K nodes to 0 when the clock value for the first node is less than 0;
  when a Sync message has been received at the first node:
    comparing the clock value for the first node to a minimum event-response delay (D);
    setting the clock value for the first node equal to between 0 and a communication latency value ($\gamma$) when the clock value for the first node is less than D; and
    setting the clock value for the first node equal to between 0 and $\gamma$ and transmitting a new Sync message to as many of the K nodes as are directly connected to the first node when the clock value for the first node is greater than or equal to both D and a calibrated graph threshold ($T_S$);
  when the Sync message has not been received by the first node:
    comparing the clock value for the first node to a calibrated resynchronization period (P);
    incrementing the clock value for the first node when the clock value for the first node is less than P; and
    setting the clock value for the first node to 0 and transmitting a new Sync message to as many of the K nodes as are directly connected to the first node when the clock value for the first node is greater than or equal to P;
  wherein the method deterministically converges to synchrony within a time bound (C) that is a substantially linear function of P, and is executed without using a global clock or a globally-generated signal, globally-generated pulse, or globally-generated message of any kind for self-stabilization.

18. The method of claim 17, further comprising disposing of a received Sync message after one tick of the logical time clock for the first node.

19. The method of claim 17, further comprising:
  ignoring all transmitted Sync messages received within a calibrated ignore window [D, $T_S$].

* * * * *